(12) United States Patent
Wisnudel et al.

(10) Patent No.: US 7,226,719 B2
(45) Date of Patent: *Jun. 5, 2007

(54) LIMITED PLAY DATA STORAGE MEDIA AND COATING FORMULATIONS THEREON

(75) Inventors: Marc Brian Wisnudel, Clifton Park, NY (US); Daniel Robert Olson, Voorheesville, NY (US); David Andrew Simon, Johnstown, NY (US); Kathryn Lynn Longley, Saratoga Springs, NY (US); Edward Paul Lindholm, Brookline, MA (US)

(73) Assignee: General Electric Company, Schenectady, NY (US)

( * ) Notice: Subject to any disclaimer, the term of this patent is extended or adjusted under 35 U.S.C. 154(b) by 510 days.

This patent is subject to a terminal disclaimer.

(21) Appl. No.: 10/657,632

(22) Filed: Sep. 8, 2003

(65) Prior Publication Data

US 2005/0051053 A1 Mar. 10, 2005

(51) Int. Cl.
G11B 7/24 (2006.01)
G02B 5/23 (2006.01)
C08K 5/053 (2006.01)

(52) U.S. Cl. .............. 430/270.11; 430/945; 720/719; 428/64.8; 252/586; 523/168; 523/125; 369/288

(58) Field of Classification Search .............. None
See application file for complete search history.

(56) References Cited

U.S. PATENT DOCUMENTS

| | | |
|---|---|---|
| 3,635,895 A | 1/1972 | Kramer |
| 3,697,395 A | 10/1972 | Kehr et al. |
| 3,697,402 A | 10/1972 | Kehr et al. |
| 3,740,761 A * | 6/1973 | Fechter ............ 346/135.1 |
| 4,001,184 A | 1/1977 | Scott |
| 4,179,548 A | 12/1979 | Schroeter et al. |
| 4,217,438 A | 8/1980 | Brunelle et al. |
| 4,234,212 A * | 11/1980 | Kato et al. ............ 503/210 |
| 4,404,257 A | 9/1983 | Olson |
| 4,422,671 A * | 12/1983 | Cespon ............ 503/210 |
| 4,491,508 A | 1/1985 | Olson et al. |
| 4,985,345 A * | 1/1991 | Hayakawa et al. ....... 430/335 |
| 5,084,593 A * | 1/1992 | Gotoh et al. ............ 558/405 |
| 5,397,686 A * | 3/1995 | Dominick et al. ....... 430/346 |
| 5,815,484 A | 9/1998 | Smith et al. |
| 6,011,772 A | 1/2000 | Rollhaus et al. |
| 6,338,933 B1 | 1/2002 | Lawandy et al. |
| 6,343,063 B1 | 1/2002 | Rollhaus et al. |
| 6,925,051 B2 * | 8/2005 | Wisnudel et al. ......... 369/286 |
| 7,026,029 B2 * | 4/2006 | Lindholm et al. ........ 428/64.1 |
| 2002/0102499 A1 * | 8/2002 | Krieg-Kowald .......... 430/321 |
| 2003/0002431 A1 | 1/2003 | Breitung et al. |
| 2003/0032557 A1 * | 2/2003 | Bhatt et al. ............ 503/209 |
| 2003/0050191 A1 * | 3/2003 | Bhatt et al. ............ 503/216 |
| 2003/0198892 A1 * | 10/2003 | Ezbiansky et al. ...... 430/270.14 |
| 2003/0207206 A1 * | 11/2003 | Olson et al. ........... 430/270.14 |
| 2004/0014859 A1 * | 1/2004 | Ezbiansky et al. ....... 524/379 |
| 2004/0137188 A1 * | 7/2004 | Lindholm et al. ........ 428/64.1 |
| 2004/0152013 A1 * | 8/2004 | Olson et al. .......... 430/270.11 |
| 2005/0049931 A1 * | 3/2005 | Wisnudel et al. ............ 705/26 |
| 2005/0050571 A1 * | 3/2005 | Wisnudel et al. ............ 720/718 |
| 2005/0051053 A1 * | 3/2005 | Wisnudel et al. ....... 106/163.01 |

FOREIGN PATENT DOCUMENTS

| | | | |
|---|---|---|---|
| JP | 63-173685 | * | 7/1988 |
| JP | 06-032060 | * | 2/1994 |
| WO | WO 01/29828 | | 4/2001 |
| WO | WO 02/075733 | | 9/2002 |
| WO | 02/096664 | * | 12/2002 |

OTHER PUBLICATIONS

Encyclopedia of Polymer Science and Technology, vol. 1, Interscience Publishers, John Wiley & Sons, Inc., 246-328 (1964) and references cited therein.
Pauly, S., "Permeability and Diffusion Data," Encyclopedia of Polymer Science vol. VI, 563-569.

* cited by examiner

Primary Examiner—Martin Angebranndt
(74) Attorney, Agent, or Firm—Carter, DeLuca, Farrell & Schmidt, LLP

(57) ABSTRACT

The present invention provides a formulation for a reactive dye layer for a limited-play optical storage medium, the reactive formulation including at least one carrier material or curable acrylate monomer, at least one reactive material disposed within the carrier material or acrylate monomer, and at least one photo-bleaching retarder material disposed within the at least one adhesive material. The at least one photo-bleaching retarder material includes at least one polymeric polyhydroxy compound selected from the group consisting of polyhydroxystyrenes, cellulose, and functionalized cellulose derivatives.

55 Claims, No Drawings

LIMITED PLAY DATA STORAGE MEDIA AND COATING FORMULATIONS THEREON

The present invention is allied with co-pending U.S. patent application Ser. No. 10/657,631 filed on Sep. 8, 2003 which is incorporated herein by reference in its entirety.

BACKGROUND OF THE INVENTION

The present invention is related to storage media. More particularly, the present invention is related to limited play storage media.

Optical, magnetic and magneto-optic media are primary sources of high performance storage technology which enables high storage capacity coupled with a reasonable price per megabyte of storage. Use of optical media has become widespread in audio, video, and computer data applications in such formats as compact disc (CD), digital versatile disc (DVD) including multi-layer structures like DVD-5, DVD-9, and multi-sided formats such as DVD-10, and DVD-18, magneto-optical disc (MO), and other write-once and re-writable formats such as CD-R, CD-RW, DVD-R, DVD-RW, DVD+RW, DVD-RAM, and the like, hereinafter collectively "data storage media". In these formats, data are encoded onto a substrate into a digital data series. In pre-recorded media for optical media, such as CD, the data are typically pits and grooves formed on the surface of a plastic substrate through a method such as injection molding, stamping or the like.

In some applications, it is desirable to have a limited life for an optical disc. For example, sample computer programs are provided to potential customers in order to entice them to purchase the software. The programs are intended to be used for a limited period of time. Additionally, music and movies are currently rented for a limited time period. In each of these applications and others, when that time has expired, the disc must be returned. A need exists for machine-readable optical discs that do not need to be returned at the end of a rental period. Limited-play discs provide a solution to this problem.

Limited play discs have been produced in various fashions. One method comprised forming a disc where the reflective layer is protected with a porous layer such that the reflective layer becomes oxidized over a pre-determined period of time. Once the reflective layer attains a certain level of oxidation, the disc is no longer readable. The problem with this and other limited play techniques is that these techniques are defeatable. If the method for providing limited play to optical discs can be easily defeated by a customer or a cottage industry, discs would no longer be "limited-play". In the case of a coating or material rendering an optical disc unplayable, for example, facile removal or modification of that coating and/or material could provide a disc with unlimited playability.

There is a great desire on the part of movie studios to protect their intellectual property. Commercialization of limited-play data storage media that can be easily defeated to afford data storage media with unlimited playability would present an unacceptable risk of losing intellectual property.

BRIEF DESCRIPTION OF THE INVENTION

In one aspect, the present invention relates to a coating formulation for a reactive dye layer for a limited-play optical storage medium, said coating formulation comprising:

(a) at least one polymeric polyhydroxy compound
(b) at least one carrier; and
(c) at least one reactive material.

In another aspect the present invention relates to an adhesive formulation for a limited play optical storage medium, said adhesive formulation comprising:

a) at least one polymeric polyhydroxy compound
b) at least one curable acrylate monomer; and
c) at least one reactive material.

In another aspect, the present invention relates to a limited play optical storage medium having a reactive layer comprising at least one polymeric polyhydroxy compound, at least one carrier, and at least one reactive material such as leuco methylene blue.

DETAILED DESCRIPTION OF THE INVENTION

In this specification and in the claims that follow, reference will be made to a number of terms that shall be defined to have the following meaning.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

Photobleaching of a limited-play storage medium for data has been found to be effectively reduced through the use of one or more polymeric polyhydroxy compounds in combination with the reactive material which renders the medium "limited-play". Where the reactive material in its opaque form is subject to a photobleaching effect, exposure of the "spent" limited play storage medium to photobleaching conditions may in some instances defeat the intent of the manufacturer to provide a storage medium for data which is readable for only a limited and carefully controlled time period. It has been found that polymeric polyhydroxy compounds such as polyhydroxystyrene, polyhydroxystyrene copolymers, and cellulose and its derivatives either singly or in combination when present in a reactive layer of a limited play optical storage medium, are surprisingly effective at retarding or preventing photobleaching.

Upon exposure to oxygen, a reactive material, e.g., leuco methylene blue, which is essentially colorless, is oxidized to form an opaque or semi-opaque layer (e.g., the deep blue dye, methylene blue). Data storage media with the opaque/semi-opaque layer can no longer be played in media players. By adjusting the time it takes to turn opaque, the reactive layer can be used to provide limited-play data storage media having the desired life for the given application. Limited-play data storage media prepared solely with the reactive material layer, in this manner, are easily "defeated", e.g., under photobleaching conditions the opaque form of the reactive material is rendered sufficiently transparent so that the storage medium may continue to be read (i.e. the medium is no longer "limited-play"). As noted, the use of a polyhydroxystyrene compound, a cellulose derivative or combination thereof in the reactive layer affords limited-play data storage media that cannot be defeated by exposure to photobleaching conditions.

Examples of polyhydroxystyrene compounds which may be used include the homopolymer of hydroxystyrene, and copolymers of hydroxystyrene with one or more olefin co-monomers. Typically, these hydroxystyrene polymers are derived from the hydrolysis of the corresponding acetoxystyrene polymer. Suitable olefin co-monomers include methyl methacrylate, 2-hydroxyethyl methacrylate, methyl acrylate, ethyl acrylate, dimethyl fumarate, dimethyl maleate, maleic anhydride, acrylonitrile, butadiene, isoprene, styrene, ethylene, tetrafluoroethylene, and the like. The polyhydroxystyrene copolymers so produced may be employed singly or in combination, and may be used as a blend with polyhydroxystyrene homopolymer. In one embodiment of the present invention the reactive layer comprises as a polyhydroxystyrene compound poly(hydroxystyrene-co-methyl methacrylate). In an alternate embodiment of the present invention the reactive layer comprises as a polyhydroxystyrene compound a branched polyhydroxystyrene having a dendridic structure, such compounds may be made by dehydration and oligimerization of 4-hydroxy-alpha-methylbenzenemethanol (PHS-B from CHEMFIRST). Additional polymeric polyhydroxy compounds that may be used are phenol-formaldehyde and resorcinol-formaldehyde condensation products such as the PENACOLITE resins from INDSPEC.

As noted, the formulations used as the reactive dye layer present in limited play optical storage media comprise at least one polymeric polyhydroxy compound which serves to prevent the photobleaching of the reactive dye layer after it has been rendered opaque. In addition to polyhydroxystyrene compounds it has been discovered that cellulose and its derivatives are also effective at preventing or retarding the photobleaching of a "spent" optical data storage medium (e.g. a "spent" DVD). Suitable cellulose derivatives suitable for use according to the present invention include cellulose, cellulose acetate, cellulose acetate butyrate, cellulose propionate, cellulose triacetate, ethyl cellulose, hydroxybutyl methyl cellulose, hydroxypropyl cellulose, hydroxypropyl methyl cellulose, methyl cellulose, and the like.

The data storage medium typically includes a first substrate, a second substrate, a reactive material dye layer, a data layer; and a reflective layer. At least one of the first and second substrates is optically transparent material (such as glass or plastic) with a low birefringence and high light transmittance at the read laser wavelength, i.e., is readable in an optical media device. Typically, the read laser wavelength is in a range between about 390 nanometers and about 430 nanometers (blue and blue-violet lasers) or in a range between about 630 nanometers and about 650 nanometers (red lasers). Typically, the second substrate is optically transparent and comprises material having sufficient optical clarity, e.g., a birefringence of about ±100 nm or less, to render the data storage material readable in a media device. The optically transparent second substrate is situated between the reactive layer and a laser incident surface. In theory, any material that exhibits these properties can be employed as the second substrate. For a host reasons relating to cost, processability, and ease of handling, plastic materials are preferred for both the first and second substrates.

The plastic employed for both the first substrate and second substrate should be capable of withstanding subsequent processing parameters (e.g., application of subsequent layers) such as sputtering temperatures of about room temperature (about 25° C.) up to about 150° C., and subsequent storage conditions (e.g., in a hot car having temperatures up to about 70° C.). That is, it is desirable for the plastic to have sufficient thermal stability to prevent deformation during the various layer deposition steps as well as during storage by the end-user. Possible plastics include thermoplastics with glass transition temperatures of about 100° C. or greater, with about 125° C. or greater preferred, about 150° C. or greater more preferred, and about 200° C. or greater even more preferred (e.g., polyetherimides, polyetheretherketones, polysulfones, polyethersulfones, polyetherethersulfones, polyphenylene ethers, polyimides, polycarbonates, etc.); with materials having glass transition temperatures greater than about 250° C. more preferred, such as polyetherimide in which sulfonedianiline or oxydianiline has been substituted for m-phenylenediamine, among others, as well as polyimides, combinations comprising at least one of the foregoing plastics, and others. Generally, polycarbonates are preferred.

Some possible examples of substrate materials include, but are not limited to, amorphous, crystalline, and semi-crystalline thermoplastic materials such as: polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, poly(methyl methacrylate) (PMMA), methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, and tetrafluoroethylenes (e.g., TEFLON's).

As used herein, the terms "polycarbonate" and "polycarbonate composition" includes compositions having structural units of the formula (I):

in which at least about 60 percent of the total number of $R^1$ groups are aromatic organic radicals and the balance thereof are aliphatic, or alicyclic radicals. Preferably, $R^1$ is an aromatic organic radical and, more preferably, a radical of the formula (II):

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexylmethylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being biphenol. The bridging radical $Y^1$ can be a hydrocarbon group or a saturated hydrocarbon group, for example, methylene, cyclohexylidene or isopropylidene or a heteroatom such as —O— or —S.

Polycarbonates can be produced by the reaction of dihydroxy compounds in which only one atom separates $A^1$ and $A^2$. As used herein, the term "dihydroxy compound" includes, for example, bisphenol compounds having general formula (III) as follows:

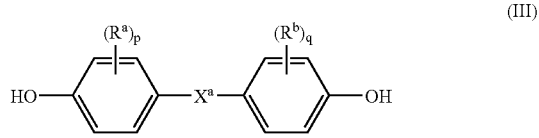

(III)

wherein $R^a$ and $R^b$ each independently represent a halogen atom, or a monovalent hydrocarbon group; p and q are each independently integers from 0 to 4; and $X^a$ represents one of the groups of formula (IV):

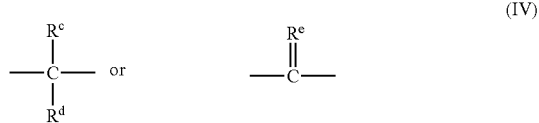

(IV)

wherein $R^c$ and $R^d$ each independently represent a hydrogen atom or a monovalent linear or cyclic hydrocarbon group, and $R^e$ is a divalent hydrocarbon group.

Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438. A nonexclusive list of specific examples of the types of bisphenol compounds that may be represented by formula (III) includes the following: 1,1-bis(4-hydroxyphenyl) methane; 1,1-bis(4-hydroxyphenyl) ethane; 2,2-bis (4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylph propane; bis (hydroxyaryl) alkanes such as 2,2-bis(4-hydroxy-3-bromophenyl) propane; 1,1-bis(4-hydroxyphenyl)cyclopentane; 4,4'-biphenol; and bis(hydroxyaryl) cycloalkanes such as 1,1-bis(4-hydroxyphenyl)cyclohexane; and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have carbon atoms in a range between about 2 and about 40. A preferred aliphatic diacid is dodecandioic acid.

Polyarylates and polyester-carbonate resins or their blends can also be employed. Branched polycarbonates are also useful, as well as blends of linear polycarbonates and branched polycarbonates. The branched polycarbonates may be prepared by adding a branching agent during polymerization.

These branching agents are well known and may comprise polyfunctional organic compounds containing at least three functional groups which may be hydroxyl, carboxyl, carboxylic anhydride, haloformyl, and mixtures comprising at least one of the foregoing branching agents. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, and the like, as well as combinations comprising at least one of the foregoing branching agents. The branching agents may be added at a level in a range between about 0.05 and about 2.0 weight percent, based upon the total weight of the substrate. Examples of branching agents and procedures for making branched polycarbonates are described in U.S. Pat. Nos. 3,635,895 and 4,001,184. All types of polycarbonate end groups are herein contemplated.

Preferred polycarbonates are based on bisphenol A, in which each of $A^1$ and $A^2$ is p-phenylene and $Y^1$ is isopropylidene. Preferably, the weight average molecular weight of the polycarbonate is in a range between about 5,000 and about 100,000 atomic mass units, more preferably in a range between about 10,000 and about 65,000 atomic mass units, and most preferably in a range between about 15,000 and about 35,000 atomic mass units.

In monitoring and evaluating polycarbonate synthesis, it is of particular interest to determine the concentration of Fries product present in the polycarbonate. The generation of significant Fries product can lead to polymer branching, resulting in uncontrollable melt behavior. As used herein, the terms "Fries" and "Fries product" denote a repeating unit in polycarbonate having the formula (V):

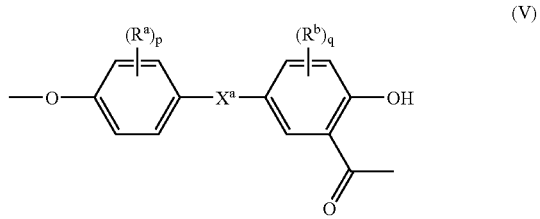

(V)

wherein $X^a$ is a bivalent radical as described in connection with Formula (III) given above.

The polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives.

In order to aid in the processing of the substrate material (e.g., the production of polycarbonate via a melt process) or to control a property of the substrate material (e.g., viscosity), catalyst(s) may also be employed. Possible catalysts include tetraalkylammonium hydroxide, tetraalkylphosphonium hydroxide, and the like, with diethyldimethylammonium hydroxide and tetrabutylphosphonium hydroxide preferred. The catalyst(s) can be employed alone or in combination with quenchers such as acids, e.g., phosphorus acid, and the like. Additionally, water may be injected into the polymer melt during compounding and removed as water vapor through a vent to remove residual volatile compounds.

Data storage media can be produced by first forming the substrate material using a conventional reaction vessel capable of adequately mixing various precursors, such as a single or twin-screw extruder, kneader, blender, or the like. The extruder should be maintained at a sufficiently high temperature to melt the substrate material precursors without causing decomposition thereof. For polycarbonate, for example, temperatures in a range between about 220° C. and about 360° C. can be used, and preferably in a range between about 260° C. and about 320° C. Similarly, the residence time in the extruder should be controlled to minimize decomposition. Residence times of up to about 2 minutes (min) or more can be employed, with up to about 1.5 min preferred, and up to about 1 min especially preferred. Prior to extrusion into the desired form (typically pellets, sheet, web, or the like), the mixture can optionally be filtered, such as by melt filtering, the use of a screen pack, or combinations thereof, or the like, to remove undesirable contaminants or decomposition products.

Once the plastic composition has been produced, it can be formed into the substrate using various molding, processing techniques, or combinations thereof. Possible techniques include injection molding, film casting, extrusion, press molding, blow molding, stamping, and the like. Once the substrate has been produced, additional processing, such as electroplating, coating techniques (spin coating, spray coating, vapor deposition, screen printing, painting, dipping, and the like), lamination, sputtering, and the like, as well as combinations comprising at least one of the foregoing processing techniques, may be employed to dispose desired layers on the substrate. Typically the substrate has a thickness of up to about 600 microns.

The reactive layer, which is a coating formulation that comprises both a carrier and a reactive material, should initially have sufficient transmission to enable data retrieval by the data storage media device and subsequently form a layer which inhibits data retrieval by that device (e.g., which absorbs a sufficient amount of incident light, reflected light, or combinations thereof at the wavelength of the laser in the given device). Typically a layer that allows an initial percent reflectivity from the reflective layer of about 50% or greater can be employed, with an initial percent reflectivity of about 65% or greater preferred, and an initial percent reflectivity of about 75% or greater more preferred. Once the media has been exposed to oxygen, e.g., air, for a desired period of time (e.g., the desired allowable play time of the media), the layer preferably comprises a percent reflectivity of about 45% or less, with about 30% or less preferred, about 20% or less more preferred, and about less than 10% especially preferred.

Possible reactive materials include oxygen sensitive "leuco" (i.e. reduced) forms of methylene blue, brilliant cresyl blue, basic blue 3, and toluidine 0, as well as reaction products, combinations comprising at least one of the foregoing materials and protected forms of any of the foregoing reactive materials. The structures of representative oxygen sensitive dyes are set forth below:

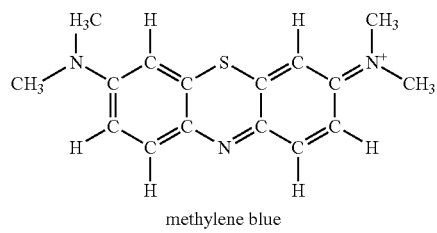
methylene blue

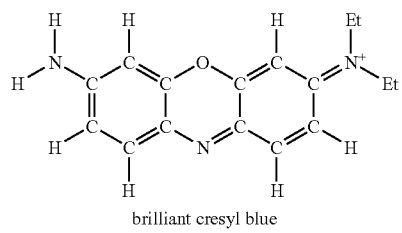
brilliant cresyl blue

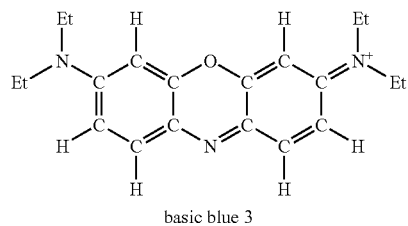
basic blue 3

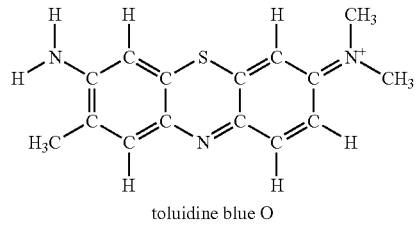
toluidine blue O

In one embodiment of the present invention the oxygen sensitive reactive material comprises N-(triisoprpylsilyloxycarbonyl)leuco methylene blue labeled "TIPSOCLMB" below.

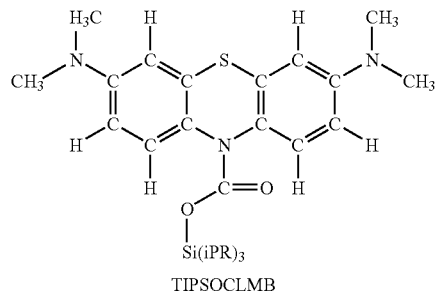
TIPSOCLMB

Another possible reactive material comprises a dye which re-oxidizes over approximately 48 hours.

The oxidation-reduction scheme below shows the sodium borohydride reduction of the oxidized form of methylene blue to its reduced "leuco" form and the oxygen dependent reoxidation to form the highly colored form of methylene blue dye.

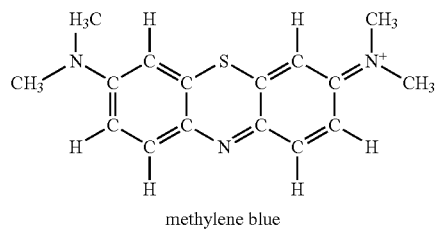 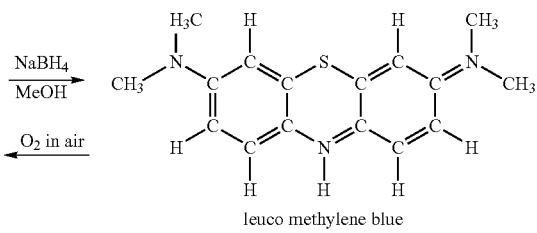

methylene blue ⟶ leuco methylene blue

The polymeric polyhydroxy compound used according to the present invention effectively reduces photobleaching. "Effectively reduces photobleaching" as used herein refers to a photobleaching test which measures the exposure time under photobleaching conditions required to convert an opaque unplayable disc into a minimally playable disc. Thus, the exposure time required to reach a critical reflectivity at which the limited play storage medium for data is considered transformed from "unreadable" to "readable" is significantly greater when at least one polymeric polyhydroxy compound is present in the reactive dye layer than when said polymeric polyhydroxy compound is absent. Typically, the critical reflectivity is less than about 20%, and more typically, the critical reflectivity is less than about 10%.

Typically, the polymeric polyhydroxy compound is present in an amount corresponding to between about 1 weight % and about 20 weight %, more typically between about 3 weight percent (%) and about 15 weight %, and most typically between about 5 weight % and about 10 weight %, based upon the total weight of the reactive layer.

In addition to the reactive materials discussed above, numerous other dyes and light blocking materials are available through synthesis and commercial sources which can be used to render the data storage media "limited play". For example, other suitable reactive materials are disclosed in U.S. Pat. No. 4,404,257 and U.S. Pat. No. 5,815,484. The reactive materials may be a single molecular species or may comprise a mixture of structurally similar or dissimilar reactive materials.

The amount of reactive material in the reactive layer is dependent upon the desired life of the data storage media. The amount of reactive material in the reactive layer can be as little as about 1 weight percent, with about 2 weight % preferred, based upon the total weight of the reactive layer; with an upper amount of reactive material being about 10 weight %, with about 7 weight % preferred, about 6 weight % more preferred, and about 5 weight % even more preferred. The amount of reactive material in the reactive layer should be such that the final reflectivity for media exposed to oxygen is preferably less than 10%.

The reactive material is preferably mixed with a carrier for deposition on, impregnation into, or a combination of deposition on and impregnation into at least a portion of the surface of the substrate to form the reactive layer. The carrier is typically present in a range between about 65% and about 95%, and more typically present in a range between about 70% and about 80%, based upon the total weight of the reactive layer. Possible carriers comprise thermoplastic acrylic polymers, polyester resins, epoxy resins, polythiolenes, UV curable organic resins, polyurethanes, thermosettable acrylic polymers, alkyds, vinyl resins and the like, as well as combinations comprising at least one of the foregoing carriers. Polyesters include, for example, the reaction products of aliphatic dicarboxylic acids including, for example, fumaric or maleic acid with glycols, such as ethylene glycol, propylene glycol, neopentyl glycol, and the like, as well as reaction products and mixtures comprising at least one of the foregoing.

Some epoxy resins, which can be the used as the carrier, include monomeric, dimeric, oligomeric, or polymeric epoxy material containing one or a plurality of epoxy functional groups. Examples include reaction products of bisphenol-A and epichlorohydrin, epichlorohydrin with phenol-formaldehyde resins, and the like. Other organic resins can be in the form of mixtures of polyolefin and polythiols, such as shown by Kehr et al, U.S. Pat. Nos. 3,697,395 and 3,697,402.

The term thermoplastic acrylic polymers, as used herein, is meant to embrace within its scope those thermoplastic polymers resulting from the polymerization of one or more acrylic acid ester monomers as well as methacrylic acid ester monomers. These monomers are represented by the general Formula VII:

$$CH_2=CWCOOR^f \quad (VII)$$

wherein W is hydrogen or a methyl radical and $R^f$ is an alkyl radical, preferably an alkyl radical comprising carbon atoms in a range between about 1 and about 20. Some non-limiting examples of alkyl groups represented by $R^f$ include methyl, ethyl, n-propyl, isopropyl, n-butyl, isobutyl, sec-butyl, tert-butyl, pentyl, isopentyl, hexyl, and the like.

Some non-limiting examples of acrylic acid ester monomers represented by Formula VII include: methyl acrylate, isopropyl acrylate, n-propyl acrylate, n-butyl acrylate, isobutyl acrylate, 2-ethylhexyl acrylate, and the like. Some non-limiting examples of methacrylic acid ester monomers represented by Formula VII include: methyl methacrylate, ethyl methacrylate, butyl methacrylate, hexyl methacrylate, isobutyl methacrylate, propyl methacrylate, and the like, as well as reaction products and combinations comprising at least one of the foregoing.

Copolymers of the above acrylate and methacrylate monomers are also included within the term thermoplastic acrylic polymers as it appears herein. Preferably, the thermoplastic acrylic polymer is a copolymer of poly(methyl methacrylate/methacrylic acid). The polymerization of the monomeric acrylic acid esters and methacrylic acid esters to provide the thermoplastic acrylic polymers may be accomplished by any of the known polymerization techniques. The thermoplastic acrylic polymers typically have an inherent viscosity less than about 0.300 centimeters cubed per gram ($cm^3 g^{-1}$) and more typically, less than about 0.250 $cm^3 g^{-1}$, and most typically, less than about 0.200 $cm^3 g^{-1}$.

In order to enhance adhesion of the reactive layer to the substrate, a primer may be employed there between. The thermoplastic acrylic polymers useful as primers include:

acrylic homopolymers derived from a single type of acrylic acid ester monomer; methacrylic homopolymers derived from a single type of methacrylic acid ester monomer; copolymers derived from two or more different acrylic acid ester monomers, two or more different methacrylic acid ester monomers, or an acrylic acid ester monomer and a methacrylic acid ester monomer; and the like, as well as combinations comprising at least one of the foregoing primers.

Mixtures of two or more of the aforedescribed thermoplastic acrylic polymers, e.g., two or more different acrylic homopolymers, two or more different acrylic copolymers, two or more different methacrylic homopolymers, two or more different methacrylic copolymers, an acrylic homopolymer and a methacrylic homopolymer, an acrylic copolymer and a methacrylic copolymer, an acrylic homopolymer and a methacrylic copolymer, and an acrylic copolymer and a methacrylic homopolymer, and reaction products thereof, can also be used.

Optionally, the reactive layer can be applied to the substrate using various coating techniques such as painting, dipping, spraying, spin coating, screen printing, and the like. For example, the reactive layer can be mixed with a relatively volatile solvent, preferably an organic solvent, which is substantially inert towards the polycarbonate, i.e., will not attack and adversely affect the polycarbonate, but which is capable of dissolving the carrier. Generally the concentration of the carrier in the solvent is about 5 weight % or greater, with about 10 weight % or greater preferred, while the upper range of the polymer is about 25 weight %, with about 20 weight % or less preferred. Examples of some suitable organic solvents include ethylene glycol diacetate, butoxyethanol, methoxypropanol, the lower alkanols, and the like. Generally, the concentration of the solvent in the coating solution is about 70 weight % or greater, with about 75 weight % or greater preferred, while the upper range of the polymer is about 90 weight %, with about 85 weight % or less preferred.

The reactive layer may also optionally contain various additives such as flatting agents, surface active agents, thixotropic agents, and the like, and reaction products and combinations comprising at least one of the foregoing additives.

The thickness of the reactive layer is dependent upon the particular reactive material employed, the concentration thereof in the reactive layer, and the desired absorption characteristics of the layer both initially and after a desired period of time. The reactive layer can have a thickness as low as about 1 micron ($\mu$), with about 2$\mu$ preferred, and about 3$\mu$ more preferred. On the upper end, the thickness can be up to about 15$\mu$ or greater, with up to about 10$\mu$ preferred, and up to about 6$\mu$ more preferred. For example, in order to attain an initial percent reflectivity through the reactive layer of about 50% or greater and a percent reflectivity of about 30% or less after 24 hours, the layer preferably has a thickness in a range between about 1$\mu$ and about 25$\mu$, with a range between about 2$\mu$ and about 5$\mu$ microns more preferred.

Typically, the reactive layer is disposed between the reflective layer and the second substrate. The reactive layer and reflective layer may be in a sandwich configuration between the first substrate and a second substrate. The reactive layer in a sandwich configuration has a first percentage reflectivity that exceeds a second percentage reflectivity wherein the second percentage reflectivity is a percentage reflectivity for the reactive layer had it not been in a sandwich configuration.

Typically, the molded substrate is deaerated before the reactive layer is disposed on the substrate. Additionally, the reactants used to make the reactive layer are typically kept in an inert environment. After the storage medium has been produced, the disc is typically kept in an inert environment until the disc is ready for use. Typically, deaeration can occur with any inert gas, for example, nitrogen, argon, or helium.

In recordable media, the data are encoded by laser, which illuminates an active data layer that undergoes a phase change, thus producing a series of highly-reflecting or non-reflective regions making up the data stream. In these formats, a laser beam first travels through the substrate before reaching the data layer. At the data layer, the beam is either reflected or not, in accordance with the encoded data. The laser light then travels back through the substrate and into an optical detector system where the data are interpreted. Thus, the data layer is disposed between the substrate and the reflective layer. The data layer(s) for an optical application typically is pits, grooves, or combinations thereof on the substrate layer. Preferably, the data layer is embedded in the substrate surface. Typically, an injection molding-compression technique produces the substrate where a mold is filled with a molten polymer as defined herein. The mold may contain a preform, insert, etc. The polymer system is cooled and, while still in at least partially molten state, compressed to imprint the desired surface features, for example, pits and grooves, arranged in spiral concentric or other orientation onto the desired portions of the substrate, i.e., one or both sides in the desired areas.

Possible data layers for magnetic or magneto-optic applications may comprise any material capable of storing retrievable data and examples include, but are not limited to, oxides (such as silicone oxide), rare earth elements—transition metal alloy, nickel, cobalt, chromium, tantalum, platinum, terbium, gadolinium, iron, boron, others, and alloys and combinations comprising at least one of the foregoing, organic dyes (e.g., cyanine or phthalocyanine type dyes), and inorganic phase change compounds (e.g., TeSeSn, InAgSb, and the like).

The reflective layer(s) should have a sufficient thickness to reflect a sufficient amount of energy (e.g., light) to enable data retrieval. Typically the reflective layer(s) can have a thickness of up to about 700 Å or so, with a thickness in a range between about 300 Å and about 600 Å generally preferred. Possible reflective layers include any material capable of reflecting the particular energy field, including metals (e.g., aluminum, silver, gold, silicon, titanium, and alloys and mixtures comprising at least one of the foregoing metals, and others).

An example of a limited play polycarbonate data storage media comprises an injection molded polycarbonate substrate. Other various layers that may be disposed on the substrate include: a dielectric layer(s), an adhesive layer(s), a protective layer(s), as well as combinations comprising at least one of the foregoing layers. An optical medium, for example, may include a protective layer, a reflective layer, a dielectric layer, and a data layer, with a subsequent dielectric layer in contact with the substrate and a light-absorbing layer disposed on the opposite side of the substrate via an adhesive layer, with the reactive layer disposed between the substrate and the light-absorbing layer. It is understood that the form of the data storage media is not limited to disc shape, but may be any size and shape which can be accommodated in a readout device.

The protective layer(s), which protect against dust, oils, and other contaminants, can have a thickness of greater than about 100 microns ($\mu$) to less than about 10 Å, with a thickness of about 300 Å or less preferred in some embodiments, and a thickness of about 100 Å or less especially preferred. The thickness of the protective layer(s) is usually determined, at least in part, by the type of read/write mechanism employed, e.g., magnetic, optic, or magneto-optic. Possible protective layers include anti-corrosive materials such as gold, silver, nitrides (e.g., silicon nitrides and aluminum nitrides, among others), carbides (e.g., silicon carbide and others), oxides (e.g., silicon dioxide and others), polymeric materials (e.g., polyacrylates or polycarbonates), carbon film (diamond, diamond-like carbon, and the like), among others, and combinations comprising at least one of the foregoing materials.

The dielectric layer(s), which are typically disposed on one or both sides of the data layer and are often employed as heat controllers, can typically have a thickness of up to or exceeding about 1,000 Å and as low as about 200 Å or less. Possible dielectric layers include nitrides (e.g., silicon nitride, aluminum nitride, and others); oxides (e.g., aluminum oxide); sulfides (e.g. zinc sulfide); carbides (e.g., silicon carbide); and combinations comprising at least one of the foregoing materials, among other materials compatible within the environment and preferably not reactive with the surrounding layers.

An adhesive layer may also be present which can adhere any combination of the above-mentioned layers. In one embodiment of the present invention the "reactive layer" as described herein serves as the adhesive layer which is prepared using an adhesive formulation comprising at least one polymeric polyhydroxy compound and at least one reactive material. Suitable polymeric polyhydroxy compounds and reactive materials for incorporation into adhesive formulations for use in limited play applications in which photobleaching presents a serious limitation are those polymeric polyhydroxy compounds and reactive materials described herein as suitable for coating formulations. Typically where the adhesive layer comprises a reactive material it is preferably an oxygen sensitive reactive dye of the leuco methylene blue type. In a variety of adhesive formulations the preferred oxygen sensitive reactive dye is N-(triisopropylsilyloxycarbonyl)leuco methylene blue (TIPSOCLMB). "TIPSOCLMB" represents a protected form of leuco methylene blue which must be "deprotected" in order for the characteristic oxygen sensitivity of leuco methylene blue to be triggered. The adhesive formulation typically comprises between about 0.5 and about 10 percent, preferably between about 1 and about 7 percent, and still more preferably between about 1 and about 4 percent by weight reactive material based upon the total weight of the adhesive formulation.

The adhesive formulation can comprise any material which is capable of forming an adhesive layer penetrable by oxygen and which does not substantially interfere with the transfer of light through the media from and to the data retrieval device (e.g., that is substantially transparent at the wavelength of light utilized by the device, and/or which allows a reflectivity from the media of about 50% or greater, with a percent reflectivity of about 65% or greater preferred and a percent reflectivity of about 75% or greater more preferred). Suitable components of the adhesive formulation include UV curable acrylates (which provide cross-linked acrylates, and the like), formulations providing silicon hardcoats, and the like, as well as reaction products and combinations comprising at least one of the foregoing materials. Other examples of UV materials are described in U.S. Pat. Nos. 4,179,548 and 4,491,508. Some useful polyfunctional acrylate monomers include, for example, diacrylates, triacrylates, tetraacrylates, or mixtures thereof.

In one embodiment, the adhesive formulation comprises a single polyfunctional acrylate monomer. In an alternate embodiment the adhesive formulation comprises a mixture of at least one polyfunctional acrylate monomer and at least one monoacrylate. Optionally, the adhesive formulation can comprise nonacrylic UV curable aliphatically unsaturated organic monomers in amounts up to about 50 weight % of the uncured adhesive. Aliphatically unsaturated organic monomers are illustrated by N-vinyl pyrrolidone, styrene, and the like. In some instances the adhesive formulation may comprise both the aliphatically unsaturated organic monomers and reaction products and combinations comprising at least one of the foregoing materials.

In some embodiments, the adhesive formulation comprises a photoinitiator in an amount effective to affect the photocure of the adhesive formulation. Generally, the amount of photoinitiator corresponds to about 0.01 weight %, with about 0.1 weight % preferred, up to about 10 weight %, with about 5 weight % preferred, based upon the total weight of the adhesive formulation. Possible photoinitiators include blends of ketone-type and hindered amine type materials that form suitable hard coatings upon exposure to UV radiation. It is preferable that the ratio, by weight, of the ketone compound to the hindered amine compound be about 80/20 to about 20/80. Ordinarily, about 50/50 or about 60/40 mixtures are quite satisfactory.

Other possible ketone-type photoinitiators, which preferably are used in a nonoxidizing atmosphere, such as nitrogen, include: benzophenone, and other acetophenones, benzil, benzaldehyde and 0-chlorobenzaldehyde, xanthone, thioxanthone, 2-clorothioxanthone, 9,10-phenanthrenenquinone, 9,10-anthraquinone, methylbenzoin ether, ethylbenzoin ether, isopropyl benzoin ether, α,α-diethoxyacetophenone, α,α-dimethoxyacetophenone, 1-phenyl-1,2-propanediol-2-o-benzoyl oxime, α,α-dimethoxy-α-phenylacetopheone, phosphine oxides, and the like. Further included are reaction products and combinations comprising at least one of the foregoing photoinitiators.

The photocure of the adhesive formulation may also be affected by the light-absorbing layer. When a light-absorbing layer is used that transmits more than about 5% of light in at least one wavelength in a range between about 330 nanometers and about 390 nanometers, or more preferably, transmits more than about 10% of light in at least one wavelength in a range between about 360 nanometers and about 370 nanometers, the adhesive layer produced by curing the adhesive formulation has an improved bonding capability. When the adhesive layer has an "improved bonding capability", the time it takes the storage medium for data to reach 45% reflectivity exceeds the time is takes a storage medium for data to reach 45% reflectivity with a light-absorbing layer that absorbs light that falls outside the above-mentioned range.

The adhesive formulation may also optionally comprise flatting agents, surface active agents, thixotropic agents, UV light stabilizers, UV absorbers and/or stabilizers such as resorcinol monobenzoate, 2-methyl resorcinol dibenzoate, and the like, as well as combinations and reaction products comprising at least one of the foregoing. The stabilizers can be present in an amount, based upon the weight of the uncured UV layer of about 0.1 weight %, preferably about 3 weight %, to about 15 weight %.

In order that those skilled in the art will be better able to practice the invention, the following examples are given by way of illustration and not by way of limitation.

EXAMPLE 1

Preparation of PMMA/Oxidized Leuco Methylene Blue Coating Solution

A solution of PMMA in 1-methoxy-2-propanol was prepared by adding 111 grams of ELVACITE 2008 poly(methyl methacrylate) (inherent viscosity about 0.183 cm$^3$g$^{-1}$) available from INEOS ACRYLICS to 450 grams of 1-methoxy-2-propanol in a bottle and rolling on a roller mill to effect dissolution. The resultant solution was transferred to a flask and heated to about 80° C. while a slow stream of about 100 cc/min (cubic centimeters per minute) of nitrogen was passed over the surface of the solution to produced a degassed solution of PMMA in 1-methoxy-2-propanol. This "de-aerated" solution was transferred using nitrogen pressure via cannula to an oxygen free bottle equipped with a rubber septum.

Methylene blue trihydrate (4.85 grams), camphorsulfonic acid (2.05 grams) and 1-methoxy-2-propanol (148.3 grams) were charged to a 250 milliliter (mL) flask equipped with a rubber septum. The mixture was stirred and heated on a water bath maintained at 90° C. while a stream of nitrogen was passed into the flask at a rate of about 100 cc/min using syringe needles for both the nitrogen inlet and for an outlet. To the hot (80° C.) solution was then added tin (II) 2-ethylhexanoate (20.9 grams) via syringe to effect the reduction of the methylene blue to the dark amber leuco methylene blue. To the resulting solution was added 1.1 mL of flow additive BYK-301 available from BYK Chemie. The solution was transferred via cannula to the degassed PMMA solution prepared above.

The resulting solution of PMMA and leuco methylene blue coating solution was exposed to air under ambient conditions at least 1 week during which time the leuco methylene blue oxidized to form a solution containing methylene blue and PMMA. This solution is referred to herein as poly(methyl methacrylate)/oxidized leuco methylene blue (PMMA/oxidized leuco methylene blue) coating solution.

EXAMPLE 2

Preparation of a Disc Coated with PMMA/Oxidized Leuco Methylene Blue and Measurement of Disk Reflectivity Approximately 3 mL of the PMMA/oxidized leuco methylene blue coating solution prepared in Example 1 was applied as a ring around the inner diameter of a DVD held on a spin coater. After spin coating at 600 revolutions per minute (rpm) for 60 seconds, the coating was tack-free and very blue. Reflectivity of the coated disk was measured using a DR. SHENK PROmeteus instrument, model MT-136E. A number of discs were prepared using the procedure described herein and their reflectivities were measured similarly using the DR. SHENK PROmeteus instrument. The initial average reflectivities ranged from 4.9% to 8.3%.

EXAMPLES 3–6

Limited-play DVDs were prepared as described in Examples 1 and 2 using the coating formulations shown in Table 1.

TABLE 1

COATING FORMULATIONS

| | Weight of each component in grams [g] | | | | |
|---|---|---|---|---|---|
| | Formulation 1 | Formulation 2 | Formulation 3 | Formulation 4 | Formulation 5 |
| DOWANOL PM | 82 | 410 | 164 | 164 | 164 |
| ELVACITE 2008 PMMA | 15.2 | 76 | 16 | 0 | 0 |
| PHS8 polyhydroxystyrene | 0 | 0 | 0 | 32 | 0 |
| PHS-co-MMA copolymer | 0 | 0 | 16 | 0 | 0 |
| cellulose acetate | 0 | 0 | 0 | 0 | 32 |
| Acetone | 0 | 0 | 0 | 0 | 25 |
| 4,4'-biphenol | 0 | 7.6 | 0 | 0 | 0 |
| Methylene blue trihydrate | 1.1 | 5.49 | 2.72 | 2.72 | 2.72 |
| camphorsulfonic acid | 0.55 | 2.76 | 1.36 | 1.36 | 1.36 |
| Stannous octanoate | 2.38 | 11.9 | 11.77 | 11.77 | 11.77 |
| BYK-301 | 0.15 | 0.75 | 0.30 | 0.30 | 0.30 |

Three samples from each solution were spun-coated onto the surface of DVD discs (3 mL aliquot, 600 rpm, 60 seconds). Initial reflectivities were measured as described in Example 2. Samples were placed in a Xenon WEATHER-O-METER ("WoM") for 20 hrs. Final reflectivity measurements were taken as described in Example 2. Results were compared to that of the control samples and can be seen in Table 2.

TABLE 2

| Example | Formulation | Sample | Initial % Reflectivity | % Reflectivity After 20 hrs in WoM |
|---|---|---|---|---|
| 3 | Formulation 1 | No additive | 4.2 | 24.5 |
| 4 | Formulation 2 | 10% 4,4'-biphenol | 4.3 | 10.4 |
| 5 | Formulation 3 | 7.5% PHS-co-MMA | 4.4 | 19.6 |
| 6 | Formulation 4 | 15% PHS8 | 4.5 | 4.7 |

DVDs made with PHS (polyhydroxystyrene, Example 6) in the reactive layer demonstrated significantly improved photobleaching resistance when compared to DVD with no polyhydroxy derivative in the reactive layer (Example 3). Example 5 indicates that use of a PHS-co-MMA {poly (hydroxystyrene-co-methyl methacrylate)}copolymer in the reactive layer affords some improved photobleach resistance compared to the control sample, though not as good as use of PHS alone (Example 6). Use of PHS in the reactive layer (Example 6) provides improved photobleach resistance compared to even the use of a small molecule polyhydroxy compound such as 4,4'-biphenol (Example 4).

EXAMPLES 7–9

Three films prepared using the formulation solutions of Table 1 by spin coating the formulation onto aluminized polycarbonate "half DVD" discs (3 mL aliquot, 600 rpm, 60 seconds). Three additional films were spun from a solution containing no additional additives; these three samples served as controls. Next, 5 mL of DAICURE SD698 (Dai Nippon Inc.) bonding adhesive was dispensed on the inner diameter of the half discs. A clear colorless polycarbonate half disc was placed on top and the "sandwich" was spun (1500 rpm, 20 s). Immediately after the spinning was complete, the disc was cured using a FUSION UV SYSTEMS, INC. UV light system (1.1 J/cm$^2$, 1.6 W/cm$^2$). This process was repeated for each sample. Data are given in Table 3 which illustrate the effectiveness of polymeric polyhydroxy compounds such as polyhydroxystyrene (PHS) and cellulose acetate in retarding the photobleaching observed in the control sample (Example 7).

TABLE 3

| Example | Formulation | Sample | Initial % Reflectivity | % Reflectivity After 21 hrs in WoM |
|---|---|---|---|---|
| 7 | Formulation 1 | No additive | 5.0 | 39.4 |
| 8 | Formulation 4 | PHS8 | 5.4 | 5.2 |
| 9 | Formulation 5 | Cellulose acetate | 6.0 | 5.1 |

In order that those of ordinary skill in the art will be better able to practice the present invention, the following examples of reactive adhesive layer formulations are given by way of illustration, and not by way of limitation.

Exemplary Formulation of DVD Bonding Adhesive Containing Triisopropylsilyloxycarbonyl Leuco Methylene Blue:
Part A:
10.65 g SR351 triacrylate (SARTOMER; trimethylolpropane triacrylate)
21.29 g SR495 acrylate (SARTOMER; caprolactone acrylate)
0.124 g TINUVIN 292 (CIBA GEIGY)
0.86 g IRGACURE 819 (CIBA GEIGY)
5.0 g polyhydroxystyrene (CHEMFIRST; PHS-8E01)
Part B:
0.8 g TIPSOCLMB (FLEXPLAY)
9.3 g SR339 acrylate (SARTOMER; phenoxyethyl acrylate)
Part C:
2.0 g Sn(II) 2-ethylhexanoate (ALDRICH)

The DVD bonding adhesive was an air-sensitive composition including three parts (A, B and C) that are mixed together within a few hours prior to use. Part A was prepared by first blending the SARTOMER monomers SR351 and SR495 at room temperature with gentle stirring in air, followed by the dissolution of the polyhydroxystyrene powder (PHS-8EO1) with stirring and warming to 60° C. for about one hour. Under subdued lighting conditions, the IRGACURE 819 was then added and stirring and heating were continued for about one-half hour. The powder and the total mixture should be handled with subdued or yellow filtered light from this point forward. Finally, the TINUVIN 292 was added and the mixture was briefly stirred in the dark until homogeneous (about ten minutes). Part A was relatively stable and could be stored in the dark at room temperature for several months before use.

Part B was prepared from SARTOMER SR339PI phenoxyethyl acrylate that had been stored over molecular sieves. The SARTOMER SR33PI was charged to a clean, dry, amber glass bottle followed by the addition of N(triisopropylsilyloxycarbonyl)leuco methylene blue ("TIPSOCLMB") powder. After sealing the bottle, the mixture was stirred for approximately one hour at room temperature. This solution had a limited shelf life (about 1–2 months), and required storage under dry conditions in the dark at room temperature or below. The formulation was relatively stable at –20 degrees C.

Part C was prepared by adding stannous ethylhexanoate (Aldrich Sn(II) 2-ethylhexanoate) to an appropriately sized container.

Within a few hours of use of the DVD bonding adhesive, the three parts were mixed together using the following procedure. The Part B container was opened and the entire weight of Part C were added via a syringe. The Part B container (now containing Part C) was then closed and shaken vigorously for 30 seconds. The Part A container was then opened and the entire contents of the Part B container were added. The Part A container was then closed and shaken vigorously for 1 minute, and then placed into a sonication bath for 15 minutes. The resultant DVD bonding adhesive formulation was used within 4 hours of mixing components A, B and C together.

Exemplary Procedure for Bonding a DVD

A DVD halfdisc (0.6 mm-thick polycarbonate) was centered data side up on a laboratory spin-coater. The disc was held stationary while the adhesive was dispensed on the data side in a manner creating a uniform circular ring of material at about 30–40 mm diameter from the center of the disc. The disc to be bonded was then slowly lowered down towards the solution with the edges slightly bowed away from the bottom disc. Care was taken not to entrap air between the top and bottom discs. After a few seconds, the adhesive spread between the top and bottom discs. In some instances the disc was spun so that the material reached the outer diameter of the disc. The disc was spun at 500 to 1000 rpm for about 10 seconds to level the adhesive layer and remove excess material. At this point, the disc was cured for about 2 seconds using a flash UV lamp (XENON CORPORATION RC742) with a lamp distance of about 1.5 inches.

EXAMPLES 10–13

The following samples were prepared using various DVD bonding adhesives based on the above-referenced DVD bonding adhesive formulation, but with varying concentrations of polyhydroxystyrene (PHS) as indicated in Table 4 below. In these examples, colorless GE LEXAN OQ1030 polycarbonate was used to mold the DVD substrates. After bonding, the DVDs were exposed to air for at least 1 week to allow the reactive dye (leuco methylene blue) to be converted substantially to methylene blue. The oxidized discs were then placed in an ATLAS 3SUN XENON WEATHER-O-METER (WoM) operating at an irradiance of about 5 to about 5.5 kW/m$^2$ for the times indicated in the tables below. The reflectivities of the discs were measured before and after exposure using a DR. SCHENK PROmeteus MT-136 optical disc tester. The values of reflectivity indicated below represent the intensity of reflected light expressed as a percentage of the light incident to the disc.

TABLE 5

| Example | Formulation | Additive | Initial % Reflectivity | % Reflectivity After 20 hrs in WoM | Adhesive Viscosity [Centipoise] |
|---|---|---|---|---|---|
| 10 | Formulation 6 | No additive | 4.9 | 52.3 | |
| 11 | Formulation 7 | 5% PHS | 4.9 | 26.8 | 180 |
| 12 | Formulation 8 | 10% PHS | 4.9 | 8.1 | 468 |
| 13 | Formulation 9 | 15% PHS | 4.9 | 4.9 | 2430 |

TABLE 4

FORMULATIONS OF REACTIVE DYE ADHESIVES

| | Weight of each component [g] | | | |
|---|---|---|---|---|
| | Formulation 6 | Formulation 7 | Formulation 8 | Formulation 9 |
| Part A: | | | | |
| SR351 (SARTOMER; trimethylolpropane triacrylate) | 7.4 | 9.2 | 8.5 | 7.9 |
| SR495 (SARTOMER; caprolactone acrylate) | 14.8 | 18.4 | 17.0 | 15.7 |
| TINUVIN 292 (Ciba Geigy) | 0.074 | 0.10 | 0.10 | 0.10 |
| IRGACURE 819 (Ciba Geigy) | 0.52 | 0.69 | 0.69 | 0.69 |
| Polyhydroxystyrene (CHEMFIRST; PHS-8E01) | 0 | 2 | 4 | 6 |
| Part B: | | | | |
| TIPSOCLMB (FLEXPLAY) | 0.48 | 0.64 | 0.64 | 0.64 |
| SR339 (SARTOMER; phenoxyethyl acrylate) | 5.58 | 7.44 | 7.44 | 7.44 |
| Part C: | | | | |
| Sn(II) 2-ethylhexanoate (Aldrich) | 1.2 | 1.6 | 1.6 | 1.6 |

DVDs made with PHS (Examples 11–13) in the reactive dye adhesive demonstrated significantly improved photobleaching resistance when compared to a DVD (Example 10) with no polyhydroxy derivative in the reactive dye adhesive. Furthermore the resistance to photobleaching was shown to improve with the use of higher concentrations of PHS (Example 13 with 15% PHS has a more stable reflectivity after light exposure than Examples 11 or 12 with 5 and 10% PHS, respectively). Also of importance were the viscosities of the reactive dye adhesives.

In order to produce high-quality DVDs using commercial manufacturing equipment, the bonding adhesive must have a viscosity of about 200–600 (centipoise) cP at 25° C. The use of polymeric photobleach-retarding additives such as PHS allows for easy modification of the adhesive viscosity in order to meet the viscosity requirements of the bonding equipment. This is a clear advantage of using polymeric photobleach-retarding additives as compared to small molecule additives such as 4,4-biphenol. As indicated in the table below, the adhesive viscosity increased from 180 to 2430 cP as the concentration of PHS is increased from 5 to 15%.

EXAMPLES 14–17

The following examples demonstrate that when cellulose acetate butyrate is added to the bonding adhesive the resistance to photobleaching is improved to an even greater extent than is observed with polyhydroxystyrene (PHS). Samples were placed in the WEATHER-O-METER for a longer period of time (48 hours). Example 15, in which the adhesive formulation comprises both PHS and cellulose acetate butyrate, showed an improved stability to light exposure compared to Example 14 (PHS only). Although Examples 16 and 17 (no PHS) showed significant photobleaching, the beneficial effect of cellulose acetate butyrate is still clearly evident. With 5% cellulose acetate butyrate, the % reflectivity increased to over 50% (Example 17); however, with 2% cellulose acetate butyrate, the % reflectivity increased to over 61% (Example 16). These examples also demonstrate that a combination of polymeric photobleach retarders may be used advantageously. Cellulose derivatives such as cellulose acetate, hydropropyl cellulose, hydroxypropyl methyl cellulose, and other cellulosic polymers demonstrated surprising effectiveness as photobleach retarders.

TABLE 6

FORMULATIONS OF REACTIVE DYE ADHESIVES

| | Weight of each component [g] | | | |
|---|---|---|---|---|
| | Formulation 10 | Formulation 11 | Formulation 12 | Formulation 13 |
| Part A: | | | | |
| SR238 (SARTOMER; 1,6-hexanediol diacrylate) | 7.5 | 3.67 | 4.10 | 4.0 |
| SR495 (SARTOMER; caprolactone acrylate) | 20.03 | 9.73 | 11.44 | 11.02 |
| SR440 (SARTOMER; isooctyl acrylate) | 2.51 | 1.25 | 1.25 | 1.25 |
| TINUVIN 292 (Ciba Geigy) | 0.46 | 0.23 | 0.23 | 0.23 |
| IRGACURE 819 (Ciba Geigy) | 0.80 | 0.40 | 0.4 | 0.4 |
| polyhydroxystyrene (CHEMFIRST; PHS-8E01) | 6.01 | 3.0 | 0 | 0 |
| Cellulose acetate butyrate | 0 | 0.50 | 0.50 | 1.25 |
| Part B: | | | | |
| TIPSOCLMB (FLEXPLAY) | 0.695 | 0.35 | 0.35 | 0.35 |
| SR339 (SARTOMER; phenoxyethyl acrylate) | 10.01 | 4.9 | 5.72 | 5.51 |
| Part C: | | | | |
| Sn(II) 2-ethylhexanoate (Aldrich) | 2.0 | 1.0 | 1.0 | 1.0 |

TABLE 7

| Example | Formulation | Additive | Initial % Reflectivity | % Reflectivity After 48 hrs in WoM |
|---|---|---|---|---|
| 14 | 10 | 12% PHS | 4.9 | 15.2 |
| 15 | 11 | 12% PHS & 2% cellulose acetate butyrate | 4.0 | 8.1 |
| 16 | 12 | 0% PHS & 2% cellulose acetate butyrate | 5.3 | 61.4 |
| 17 | 13 | 0% PHS & 5% cellulose acetate butyrate | 5.3 | 50.5 |

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A coating formulation for a reactive dye layer for a limited-play optical storage medium, said formulation comprising:
   (a) at least one polymeric polyhydroxy compound selected from the group consisting of branched polyhydroxystyrene homopolymers, polyhydroxystyrene copolymers prepared by polymerizing a 4-hydroxystyrene derivative with at least one olefin co-monomer, and cellulose derivatives;
   (b) at least one polymeric carrier selected from the group consisting of thermoplastic acrylic polymers, polyester resins, epoxy resins, polythiolenes, UV curable organic resins, polyurethanes, thermosettable acrylic polymers, alkyds, vinyl resins, and combinations thereof; and
   (c) at least one reactive material selected from the group consisting of oxygen sensitive leuco methylene blue, brilliant cresyl blue, basic blue 3, toluidine 0, combinations comprising at least one of the foregoing reactive materials, and protected forms of any of the foregoing reactive materials.

2. The coating formulation in accordance with claim 1 wherein said olefin co-monomer is selected from the group consisting of methyl methacrylate, 2-hydroxyethyl methacrylate, methyl acrylate, ethyl acrylate, dimethyl fumarate, dimethyl maleate, maleic anhydride, acrylonitrile, butadiene, isoprene, styrene, ethylene, and tetrafluoroethylene.

3. The coating formulation in accordance with claim 1 wherein said polyhydroxystyrene copolymer is a poly(hydroxystyrene-co-methyl methacrylate).

4. The coating formulation in accordance with claim 1 wherein said cellulose derivative is selected from the group consisting of cellulose, cellulose acetate, cellulose acetate butyrate, cellulose propionate, cellulose triacetate, ethyl cellulose, hydroxybutyl methyl cellulose, hydroxypropyl cellulose, hydroxypropyl methyl cellulose, and methyl cellulose.

5. The coating formulation in accordance with claim 1, wherein said carrier comprises poly(methyl methacrylate) and said reactive material comprises leuco methylene blue.

6. The coating formulation in accordance with claim 1, wherein said reactive material is present in an amount corresponding to between about 1 weight % and about 10 weight %, based upon a total weight of said coating formulation.

7. The coating formulation in accordance with claim 6, wherein said reactive material is present in an amount corresponding to between about 4 weight % and about 7 weight %, based upon the total weight of said coating formulation.

8. The coating formulation in accordance with claim 7, wherein said reactive material is present in an amount corresponding to between about 4 weight % and about 6 weight %, based upon the total weight of said coating formulation.

9. The coating formulation in accordance with claim 1, wherein said carrier comprises a thermoplastic acrylic polymer.

10. The coating formulation in accordance with claim 9, wherein said thermoplastic acrylic polymer comprises poly (methyl methacrylate/methacrylic acid).

11. The coating formulation in accordance with claim 1, wherein said carrier has an inherent viscosity less than about 0.300 $cm^3g^{-1}$.

12. The coating formulation in accordance with claim 11, wherein said carrier has an inherent viscosity less than about 0.250 $cm^3g^{-1}$.

13. The coating formulation in accordance with claim 12, wherein said carrier has an inherent viscosity less than about 0.200 $cm^3g^{-1}$.

14. The coating formulation in accordance with claim 1, wherein said polymeric polyhydroxy compound is present in an amount corresponding to between about 1 weight % and about 20 weight %, based upon the total weight of said formulation.

15. The coating formulation in accordance with claim 14, wherein said polymeric polyhydroxy compound is present in a range between about 3 weight % and about 15 weight %, based upon the total weight of said coating formulation.

16. The coating formulation in accordance with claim 15, wherein said polymeric polyhydroxy compound is present in a range between about 5 weight % and about 10 weight %, based upon the total weight of said coating formulation.

17. A coating formulation for a reactive dye layer for a limited-play optical storage medium, said formulation comprising:
  (a) a polyhydroxystyrene homopolymer;
  (b) a carrier comprising poly(methyl methacrylate/methacrylic acid) having an inherent viscosity of less than about 0.200 $cm^3g^{-1}$, and polymethylmethacrylate; and
  (c) a reactive material comprising N-(triisopropylsilyloxycarbonyl) leuco methylene blue;
said polyhydroxystyrene homopolymer being present in an amount corresponding to between about 5 weight % and about 10 weight % of a total weight of the reactive layer.

18. A limited play optical storage medium for data, comprising:
  a) a first optically transparent substrate;
  b) a reflective layer;
  c) a data layer disposed between said substrate and said reflective layer;
  d) a reactive layer comprising
    (i) at least one polymeric polyhydroxy compound selected from the group consisting of branched polyhydroxystyrene homopolymers, polyhydroxystyrene copolymers prepared by polymerizing a 4-hydroxystyrene derivative with at least one olefin co-monomer, and cellulose derivatives,
    (ii) at least one polymeric carrier selected from the group consisting of thermoplastic acrylic polymers, polyester resins, epoxy resins, polythiolenes, UV curable organic resins, polyurethanes, thermosettable acrylic polymers, alkyds, vinyl resins, and combinations thereof, and
    (iii) at least one reactive material; and
  e) a second substrate.

19. The limited play optical storage medium in accordance with claim 18, wherein said polymeric polyhydroxy compound comprises a branched polyhydroxystyrene homopolymer.

20. The limited play optical storage medium in accordance with claim 18, wherein said polymeric polyhydroxy compound comprises poly(hydroxystyrene-co-methyl methacrylate).

21. The limited play optical storage medium in accordance with claim 18, wherein said first substrate is plastic.

22. The limited play optical storage medium in accordance with claim 21, wherein said plastic comprises at least one thermoplastic having a glass transition temperature of about 100° C. or greater.

23. The limited play optical storage medium in accordance with claim 22, wherein said thermoplastic is selected from the group consisting of polyvinyl chloride, polyolefins, polyesters, polyamides, polysulfones, polyimides, polyetherimides, polyether sulfones, polyphenylene sulfides, polyether ketones, polyether ether ketones, ABS resins, polystyrenes, polybutadiene, polyacrylates, polyacrylonitrile, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene, and mixtures, copolymers, reaction products, and composites comprising at least one of the foregoing thermoplastics.

24. The limited play optical storage medium in accordance with claim 23, wherein said thermoplastic comprises polycarbonate.

25. The limited play optical storage medium in accordance with claim 18, wherein said reactive material is selected from the group consisting of oxygen sensitive leuco methylene blue, reduced forms of methylene blue, brilliant cresyl blue, basic blue 3, toluidine 0, and combinations comprising at least one of the foregoing reactive materials.

26. The limited play optical storage medium in accordance with claim 25, wherein said reactive layer further comprises poly(methyl methacrylate) and leuco methylene blue.

27. The limited play optical storage medium in accordance with claim 18, wherein said reactive material is present in a range between about 1 weight % and about 10 weight %, based upon a total weight of said reactive layer.

28. The limited play optical storage medium in accordance with claim 27, wherein said reactive material is present in a range between about 4 weight % and about 7 weight %, based upon the total weight of said reactive layer.

29. The limited play optical storage medium in accordance with claim 28, wherein said reactive material is present in a range between about 4 weight % and about 6 weight %, based upon the total weight of said reactive layer.

30. The limited play optical storage medium in accordance with claim 18, wherein said carrier comprises a thermoplastic acrylic polymer.

31. The limited play optical storage medium in accordance with claim 30, wherein said thermoplastic acrylic polymer comprises poly(methyl methacrylate/methacrylic acid) copolymer.

32. The limited play optical storage medium in accordance with claim 18, wherein said carrier has an inherent viscosity less than about 0.300 $cm^3g^{-1}$.

33. The limited play optical storage medium in accordance with claim 32, wherein said carrier has an inherent viscosity less than about 0.250 cm$^3$g$^{-1}$.

34. The limited play optical storage medium in accordance with claim 33, wherein said carrier has an inherent viscosity less than about 0.200 cm$^3$g$^{-1}$.

35. The limited play optical storage medium in accordance with claim 18, wherein said polymeric polyhydroxy compound is present in an amount corresponding to between about 1 weight % and about 20 weight % of a total weight of the reactive layer.

36. The limited play optical storage medium in accordance with claim 35, wherein said polymeric polyhydroxy compound is present in an amount corresponding to between about 3 weight % and about 15 weight % of the total weight of the reactive layer.

37. The limited play optical storage medium in accordance with claim 36, wherein said polymeric polyhydroxy compound is present in an amount corresponding to between about 5 weight % and about 10 weight % of the total weight of the reactive layer.

38. The limited play optical storage medium in accordance with claim 18, wherein the reflective layer comprises a metal.

39. The limited play optical storage medium in accordance with claim 38, wherein the metal is selected from the group consisting of aluminum, silver, gold, titanium, alloys, or combinations thereof.

40. The limited play optical storage medium in accordance with claim 39, wherein the metal comprises aluminum.

41. A limited play optical storage medium for data, comprising:
 a) an optically transparent polycarbonate;
 b) a reflective layer;
 c) a data layer disposed between said substrate and said reflective layer;
 d) a second substrate; and
 e) a reactive layer disposed between said reflective layer and said second substrate, said reactive layer comprising a polyhydroxystyrene homopolymer; a poly(methyl methacrylate methacrylic acid) copolymer, polymethylmethacrylate homopolymer, and leuco methylene blue; said copolymer having an inherent viscosity of less than about 0.200 cm$^3$g$^{-1}$.

42. An adhesive formulation for a reactive dye layer for a limited-play optical storage medium, said formulation comprising:
 a) at least one polymeric polyhydroxy compound selected from the group consisting of branched polyhydroxystyrene homopolymers, polyhydroxystyrene copolymers prepared by polymerizing a 4-hydroxystyrene derivative with at least one olefin co-monomer, and cellulose derivatives;
 b) at least one curable acrylate monomer; and
 c) at least one reactive material.

43. The adhesive formulation in accordance with claim 42 wherein said olefin co-monomer is selected from the group consisting of methyl methacrylate, 2-hydroxyethyl methacrylate, methyl acrylate, ethyl acrylate, dimethyl fumarate, dimethyl maleate, maleic anhydride, acrylonitrile, butadiene, isoprene, styrene, ethylene, and tetrafluoroethylene.

44. The adhesive formulation in accordance with claim 42 wherein said polyhydroxystyrene copolymer is a poly(hydroxystyrene-co-methyl methacrylate).

45. The adhesive formulation in accordance with claim 42 wherein said cellulose derivative is selected from the group consisting of cellulose, cellulose acetate, cellulose acetate butyrate, cellulose propionate, cellulose triacetate, ethyl cellulose, hydroxybutyl methyl cellulose, hydroxypropyl cellulose, hydroxypropyl methyl cellulose, and methyl cellulose.

46. The adhesive formulation in accordance with claim 42, wherein said reactive material selected from the group consisting of oxygen sensitive leuco methylene blue, brilliant cresyl blue, basic blue 3, toluidine 0, combinations comprising at least one of the foregoing reactive materials, and protected forms of any of the foregoing reactive materials.

47. The adhesion formulation of claim 46 wherein said protected form is N-(triisopropylsilyloxycarbonyl) leuco methylene blue.

48. The adhesive formulation in accordance with claim 42, wherein said reactive material is present in an amount corresponding to between about 0.5 weight % and about 10 weight %, based upon a total weight of said adhesive formulation.

49. The adhesive formulation in accordance with claim 48, wherein said reactive material is present in an amount corresponding to between about 1 weight % and about 7 weight %, based upon the total weight of said adhesive formulation.

50. The adhesive formulation in accordance with claim 49, wherein said reactive material is present in an amount corresponding to between about 1 weight % and about 4 weight %, based upon the total weight of said adhesive formulation.

51. The adhesive formulation in accordance with claim 42, wherein said curable acrylate monomer is selected from the group consisting of polyfunctional acrylates and monoacrylates.

52. The adhesive formulation in accordance with claim 51, wherein said polyfunctional acrylate comprises trimethylolpropane triacrylate, and said mono acrylate comprises phenoxyethyl acrylate.

53. The adhesive formulation in accordance with claim 52 further comprising Sn (II) 2-ethylhexanoate.

54. The adhesive formulation in accordance with claim 42 having a viscosity in a range between about 200 and about 600 cP at 25° C.

55. A limited play optical storage medium for data, comprising:
 a) a first optically transparent substrate;
 b) a reflective layer;
 c) a data layer disposed between said substrate and said reflective layer;
 d) a reactive layer prepared from an adhesive formulation comprising
  (i) at least one polymeric polyhydroxy compound selected from the group consisting of branched polyhydroxystyrene homopolymers, polyhydroxystyrene copolymers prepared by polymerizing a 4-hydroxystyrene derivative with at least one olefin co-monomer, and cellulose derivatives;
  (ii) at least one curable acrylate monomer; and
  (iii) at least one reactive material; and
 a) a second substrate.

* * * * *